United States Patent [19]

Suzuki et al.

[11] Patent Number: 5,386,866
[45] Date of Patent: Feb. 7, 1995

[54] RADIAL TIRE WITH BAND FORMED FROM PLURAL RIBBONS

[75] Inventors: Shigehiko Suzuki, Amagasaki; Ryozo Okada, Takarazuka, both of Japan

[73] Assignee: Sumitomo Rubber Industries, Ltd., Kobe, Japan

[21] Appl. No.: 742,036

[22] Filed: Aug. 8, 1991

[30] Foreign Application Priority Data

Aug. 24, 1990 [JP] Japan ............... 2-223392
Jul. 16, 1991 [JP] Japan ............... 3-202332

[51] Int. Cl.⁶ .................. B60C 9/18; B60C 9/20
[52] U.S. Cl. .................. 152/531; 152/533; 156/117
[58] Field of Search ............ 152/531, 533; 156/117

[56] References Cited

U.S. PATENT DOCUMENTS

| | | | |
|---|---|---|---|
| 1,624,615 | 4/1927 | Midgley | 156/123 |
| 3,789,899 | 2/1974 | Kobayashi | 152/533 X |
| 4,773,462 | 9/1988 | Ohkuni et al. | 152/531 X |
| 4,990,203 | 2/1991 | Okada et al. | 152/533 X |
| 5,076,336 | 12/1991 | Watanabe et al. | 152/531 X |

FOREIGN PATENT DOCUMENTS

| | | | |
|---|---|---|---|
| 544341 | 1/1956 | Belgium . | |
| 0414406 | 2/1991 | European Pat. Off. | 152/531 |
| 2405148 | 5/1979 | France . | |
| 3734700 | 4/1988 | Germany . | |
| 3911031 | 10/1989 | Germany | 152/533 |
| 51-55505 | 5/1976 | Japan . | |
| 61-35203 | 4/1986 | Japan . | |
| 62-113605 | 5/1987 | Japan | 152/531 |
| 815054 | 6/1959 | United Kingdom . | |
| 1487426 | 9/1977 | United Kingdom | 152/533 |
| 1587711 | 4/1981 | United Kingdom | 152/531 |
| 2061202 | 5/1981 | United Kingdom . | |

*Primary Examiner*—Michael W. Ball
*Assistant Examiner*—Adrienne C. Johnstone

[57] ABSTRACT

A radial tire comprises a toroidal carcass extending between beads and turned up around bead cores, and a belt reinforcement disposed radially outside the carcass and inside a tread, wherein the belt reinforcement comprises a band layer formed by plural ribbons of rubber in which one cord or two parallel cords are embedded, the ribbons are wound spirally and continuously from one edge to the other edge of the tread to be arranged side by side, the ends of the ribbons are located at the edges of the band layer, and at each of the edges of the band layer the ends of the ribbons are shifted equiangularly in the circumferential direction of the tire.

9 Claims, 4 Drawing Sheets

RADIAL TIRE WITH BAND FORMED FROM PLURAL RIBBONS

The present invention relates to a belted radial ply tire, and more particularly an improvement in the belt structure.

BACKGROUND OF THE INVENTION

To provide a tight hoop effect for a tire tread region, belt reinforcements called "endless band" made of spirally wound cords have been proposed.

In Japanese Patent Publication No. 51-55505 (JP-A-51-55505), a belt reinforcement for the tire is disclosed. The belt is formed by spirally winding a ribbon of rubber, in which reinforcing cords are embedded, around the carcass. In the ribbon at least 8 cords are embedded, and the width of the ribbon is 5 to 50 mm. Therefore, these relatively wider ends of the ribbon cause a large change in the belt rigidity in the circumferential direction of the tire.

In Japanese Patent Publication No. 61-85203 (JP-A-61-85203), a belt reinforcement formed by spirally winding two ribbons is disclosed. Therefore, in comparison with the above-mentioned belt, the time to make the belt can be reduced. However, as the two ribbons are wound each from the tire equator toward each tread edge, two ends of the ribbons appear at the tire equator, and one end appears at each tread edge portion. Those four ends change the belt rigidity and disturb the tire uniformity.

Especially, in motorcycle tires which are used under a high speed, such an unbalanced arrangement becomes a serious problem, for example, deterioration in the running stability especially during cornering, deterioration in ride comfort and the like.

SUMMARY OF THE INVENTION

It is therefore, an object of the present invention to provide a radial tire in which, by forming a band from plural ribbons which are wound spirally and arranged side by side to reduce the band making time, and also by shifting the ribbon ends at each band edge equiangularly in the circumferential direction of the tire, the tire uniformity is improved, and fluctuation of the tread rigidity is reduced at the tread edge portions.

According to one aspect of the present invention, a radial tire comprises a toroidal carcass extending between beads and turned up around bead cores, and a belt reinforcement disposed radially outside the carcass and inside a tread, wherein the belt reinforcement comprises a band layer formed by plural ribbons of rubber in which one cord or two parallel cords are embedded, the ribbons are wound spirally to be arranged side by side, the ends of the ribbons are located at the edges of the band layer, and at each of said edges of the band layer, the ends of the ribbons are shifted equiangularly in the circumferential direction of the tire around the axis of the tire.

BRIEF DESCRIPTION OF THE DRAWINGS

Embodiments of the present invention will now be described in detail in conjunction with the accompanying drawings, in which.

DETAILED DESCRIPTION OF THE INVENTION

Figure 1:
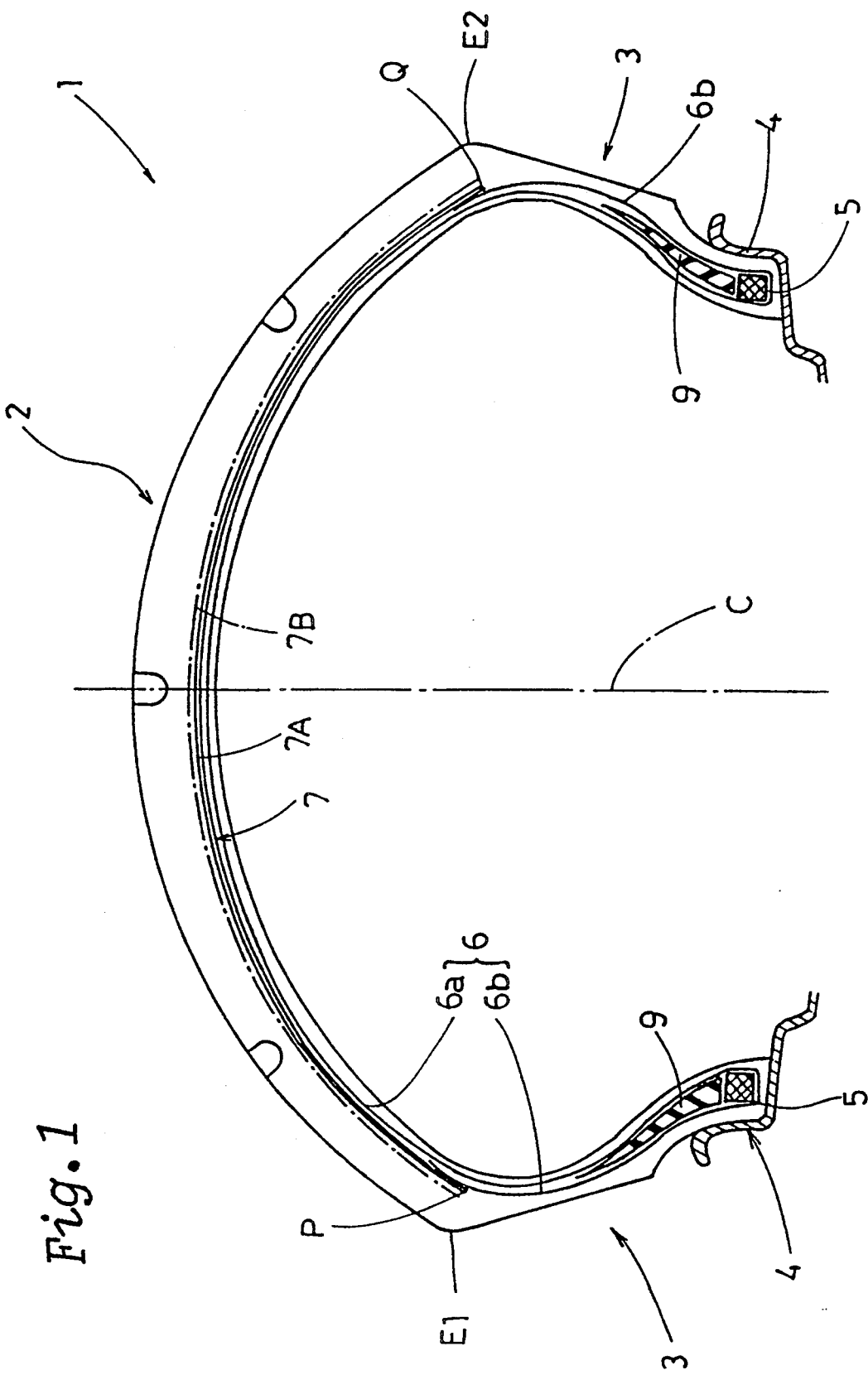
FIG. 1 is a cross sectional view of a motorcycle radial tire according to the present invention.

In FIGS. 1 to 5, the motorcycle radial tire 1 has a tread portion 2, axially spaced bead portions 4, and sidewall portions 3 extending radially inwardly from the tread edges to the bead portions.

The motorcycle tire 1 comprises a pair of bead core 5 disposed one in each bead portion 4, a carcass 6 extending between the bead portions 4 and turned up around the bead cores 5 from the axially inside to outside thereof to form two turned up portions 6b and one main portion 6a therebetween, a belt reinforcement composed of only a band layer 7 disposed radially outside the carcass 6, and a bead apex 9 disposed in each bead portion 4 and between each turned up portion 6b and the main portion 6a of the carcass, and the apex extending radially outwardly and taperingly from the bead core 5.

The tread 2 is curved so as to have a single radius of curvature and extended so that the tread width between the tread edges E1 and E2 is the maximum width of the tire.

The carcass 6 comprises at least one ply, in this embodiment one ply, of cords arranged radially of the tire at an angle of 60 to 90 degrees with respect to the tire equator C.

For the carcass cords, organic fiber cords, e.g. nylon, rayon, polyester, aromatic polyamide and the like can be used. In this embodiment, nylon fiber cords are used.

The edge of each turned up portion 6b of the carcass 6 is extended into the tread shoulder portion to be secured between the band edge and the carcass.

The band layer 7 is formed on the radially outside the carcass by spirally winding ribbons 10 around the carcass.

Figure 2:
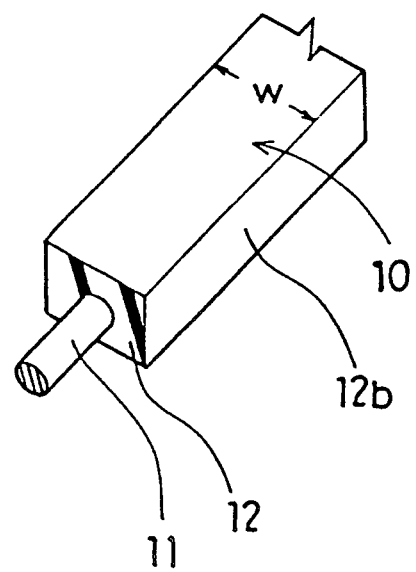
FIG. 2 is an enlarged perspective view of a ribbon.

In the ribbon 10, a single cord or two parallel cords 11 are embedded in covering rubber 12 along the length of the ribbon as shown in FIG. 2.

For the band cords 11, organic fiber cords, e.g. nylon, aromatic polyamide, polyester and the like, and/or steel cords can be used.

Preferably, a cord having a modulus of not less than 600 kgf/sq.mm is used.

The ribbon 10 in this example in which one cord is embedded has a rectangular sectional shape.

To make the band 7, plural ribbons 10 are wound spirally while being drawn up in plural lines.

Figure 3:
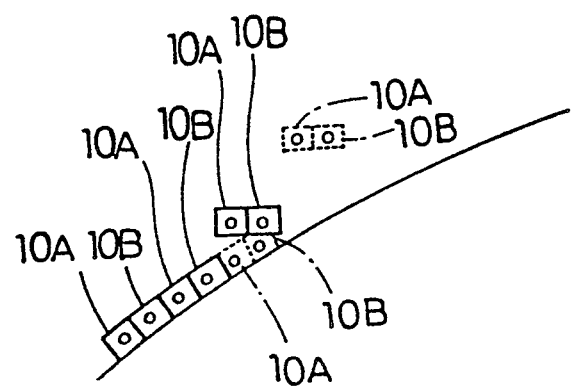
FIG. 3 is a sectional view explaining a method of winding the ribbons or belt cords.
Figure 4:
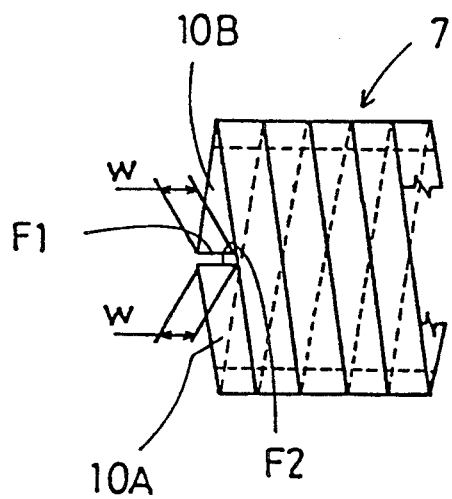
FIG. 4 is a schematic plan view of the band layer separately showing a spirally wound state of the ribbons.
Figure 5:
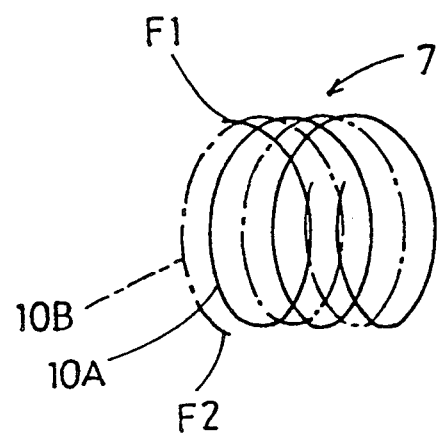
FIG. 5 is a perspective view of the separated band cords explaining the positions of the ends thereof.

For example, as shown in FIGS. 3-5, two ribbons 10A and 10B, in each of which one cord is embedded, are wound simultaneously and continuously from point P near one tread edge E1 to point Q near the other tread edge E2 across the tire equator C in the same winding direction.

Further, the ribbons are closely wound in abutting relationship so as to form a continuous-sheet-like band layer.

The ends F1 and F2 of the ribbons 10A and 10B located in each tread edge region are shifted equiangularly in the circumferential direction of the tire around the axis of the tire as shown in FIG. 4.

In this example, therefore, the pitch angles for the ribbon ends are 180 degrees. If three ribbons are used, the pitch angles are 120 degrees, and if four, 90 degrees.

By circumferentially shifting the ends, fluctuation of the rigidity is reduced.

As the belt reinforcement in this embodiment is composed of only one band layer, the bending rigidity of the tread portion 2 is decreased, while maintaining a tight hoop effect. Therefore, the ride comfort, high speed durability and running stability are improved, while the camber stiffness which is required during cornering of a motorcycle is improved.

Test tires of size 170/60R 17 having the tire structure shown in FIG. 1 and specifications given in Table 1 were prepared and tested for the following performance.

HIGH SPEED DURABILITY

While the running speed was increasing every 20 minutes at a step of 10 km/H from an initial speed of 160 km/H, the speed at which any tread failure occurred was measured as high speed durability under a maximum load and a regular pressure specified in JIS (Japanese Industrial Standard), using a drum tire tester.

The results are indicated by an index based on the assumption that the reference tire 1 is 100. The larger the value, the better the durability.

WEAR RESISTANCE

Using a drum tester, while running at a speed of 80 km/H under 150% of the maximum load and the regular pressure specified in JIS, the total running distance until the amount of wear reached 30% of the groove depth of tread grooves formed in the tread central region, was measured. The results are indicated by an index based on the assumption that the reference tire 1 is 100. The larger the value, the better the wear resistance.

MANEUVERABILITY AND RIDE COMFORT

While running a motorcycle on a straight course at 260 km/H and a 400 m radius course at 220 km/H, maneuverability and ride comfort were evaluated by a test driver.

The results are indicated by an index. The larger the value, the better the resistance.

CAMBER STIFFNESS

While changing the camber angle to be 8, 16, 24, 32 and 40 degrees, camber thrust was measured under an inner pressure of 2.9 kgf/sq.cm and a tire load of 145 kg, and the camber stiffness at each camber angle was computed therefrom, and then the mean value thereof was also computed. The mean values of the respective tires are indicated by an index. The larger the index, the better the performance.

BAND MAKING TIME

Time required to make the band of each test tire exclusive of time for incidental works, is indicated by an index based on the assumption that the reference tire 2 is 100.

As apparent from the test results, the working examples tires were improved in high speed durability, ride comfort, maneuverability and running stability in comparison with the reference tires.

TABLE 1

|  | Ex. 1 | Ex. 2 | Ex. 3 | Ex. 4 | Ref. 1 | Ref. 2 | Ref. 3 | Ref. 4 |
| --- | --- | --- | --- | --- | --- | --- | --- | --- |
| Carcass | 1 ply | | | | | | | |
| Cord | Nylon (840d/2) | | | | | | | |
| Cord Angle | 90 degrees to tire equator | | | | | | | |
| Band | | | | | | | | |
| Cord | Aromatic polyamide (1500d/2) | | | | | | | |
| Topping rubber | 100% modulus = 50 kgf/sq. cm | | | | | | | |
| No. of Ribbon | 2 | 4 | 4 | 2 | 1 | 1 | 1 | 2 |
| No. of Cord/Ribbon | 1 | 1 | 2 | 2 | 1 | 2 | 1 | 2 |
| Winding Method *1 | 2SC | 4SC | 4SC | 2SC | 1C | 1C | 1C | 2SD |
| Breaker | non | non | non | non | non | non | 2 ply | 2 ply |
| Cord | | | | | | | Nylon 1260d/2 | Aromatic Polyamide 1500d/2 |
| Cord angle | | | | | | | 13 deg. | 20 deg. |
| Test Results | | | | | | | | |
| Durability | 105 | 105 | 105 | 103 | 100 | 100 | 105 | 105 |
| Wear Resistance | 105 | 105 | 103 | 105 | 100 | 100 | 110 | 110 |
| Ride comfort | 105 | 110 | 108 | 105 | 100 | 100 | 100 | 100 |
| Maneuverability | 110 | 115 | 110 | 105 | 110 | 110 | 80 | 80 |
| Camber Stiffness | 120 | 120 | 120 | 120 | 120 | 120 | 100 | 100 |
| Band making Time | 100 | 50 | 25 | 50 | 200 | 100 | 200 | 50 |

Figure 6:
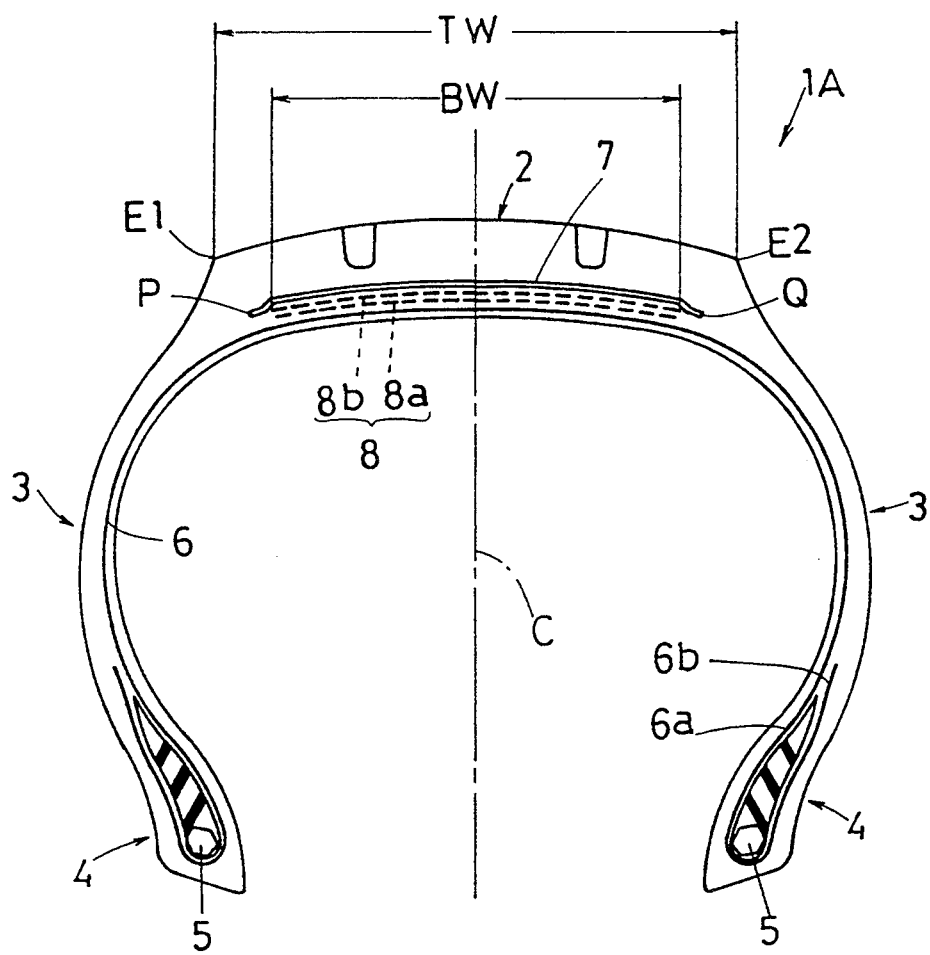
FIG. 6 is a cross sectional view of a radial tire for a four-wheeled vehicle showing another embodiment of the present invention.

*1
2SC: winding two ribbons simultaneously and continuously from edge to edge
4SC: winding four ribbons simultaneously and continuously from edge to edge
1C: winding one ribbon continuously from edge to edge
2SD: winding two ribbons simultaneously, but each from center to each edge FIG. 6 is a cross sectional view of a radial tire 1A for a four-wheeled vehicle showing another embodiment of the present invention.

Similarly, the carcass 6 extends between the bead portions 4 through the tread portion 2 and sidewall portions 3 and turned up around bead cores 5 from the axially inside to outside thereof to form two turned up portions 6b and the main portion 6a therebetween.

The carcass 6 comprises at least one ply, in this embodiment one ply, of cords arranged radially at an angle of 60 to 90 degrees with respect to the tire equator C.

For the carcass cords, the above-mentioned organic fiber cords or steel cords are used.

In this embodiment, the belt reinforcement further includes a breaker 8 in addition to a band layer 7 having a similar structure to the above.

The breaker 8 is disposed on the radially outside of the carcass 6, and the band 7 is disposed on the radially outside the breaker 8.

The breaker 8 comprises at least 2 plies, in this embodiment 2 plies 8a and 8b, of parallel cords laid at 15 to 70 degrees with respect to tire equator C so that the cords in each ply cross the cords of the other ply.

For the breaker cords, organic fiber cords, e.g. nylon, rayon, polyester, aromatic polyamide and the like, and/or steel cords are used.

The width BW of the breaker 8 is 0.8 to 0.95 times the tread width TW.

The band 7 in this embodiment is formed by winding ribbons spirally around the breaker so as to completely cover the outside of the breaker 8, and the band width is larger than the breaker width BW. Therefore, the breaker edge separation or looseness is effectively prevented, and the durability of the tread portion 2 is improved.

The ribbons may be wound in the same manner as the above-mentioned embodiment. The ends of the ribbons are equiangularly shifted in the circumferential direction of the tire at each edge of the band.

Incidentally, in the motorcycle tire 1 of the first embodiment the belt reinforcement may include such a breaker as explained in the second embodiment. Further, in the radial tire 1A for a four-wheeled vehicle, the breaker layer 8 may be omitted from the belt reinforcement.

Further, the band 7 may be provided with a two-layered structure by disposing a layer 7B of wound ribbons on the radially outside of the innermost layer 7A as shown in FIG. 1 by a chain line.

In this case, the winding direction in the outer layer 7B may be reversed to that in the inner layer 7A.

The ends of all of the ribbons in the outer and inner layers are equiangularly shifted in the circumferential direction of the tire. Further, when ribbons in the same number, for example two ribbons, are used in each layer, the shifting is preferably such that the ends of the ribbons in the inner layer and the ends of the ribbons in the outer layer alternately appear at each band edge.

As explained above, in the radial tires of the present invention, at each edge of the band, the ends of the ribbons which are wound spirally to form the band, are shifted equiangularly in the circumferential direction of the tire. Therefore, fluctuation in the tire circumferential direction of the tire, of the rigidity at the tread edge is reduced, and tread uniformity is improved, and further durability and running stability are improved.

The above-mentioned shifting of ribbon ends can be applied to a band formed by plural wound ribbons discontinuous between the edges of the band. In this case, for example, the ribbons can be wound starting from both of the tread edges E1 and E2 to the tire equator C. The ribbon ends are equiangularly shifted in the circumferential direction of the tire at each tread edge as explained above, and at the tire equator the ends of the ribbons on one side of the equator are preferably joined with those of the ribbons on the other side of the equator. Therefore, it is not always necessary to shift the ends at the tire equator.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

We claim:

1. A motorcycle radial tire comprising
   a toroidal carcass extending between a pair of bead portions and turned up around a bead core disposed in each of said bead portions,
   a belt reinforcement disposed radially outside the carcass and inside a tread having a pair of tread edges,
   said belt reinforcement comprising a first band layer formed by a plurality of ribbons of rubber in which one cord or two parallel cords are embedded, each of the ribbons having a rectangular cross-sectional shape,
   the plurality of ribbons being wound spirally and arranged side by side to have a plurality of ends in the region of each said tread edge, and
   said plurality of ends of the plurality of ribbons shifted equiangularly in the circumferential direction of the tire.

2. The tire according to claim 1, wherein the ribbons are wound continuously from one edge to the other edge of the tread.

3. The tire according to claim 1, wherein said belt reinforcement is composed of only said first band layer.

4. The tire according to claim 1, wherein said belt reinforcement further comprises a second band layer formed on the radially outside of said first band layer by a plurality of ribbons of rubber in which one cord or two parallel cords are embedded, each of the ribbons having a rectangular cross-sectional shape, the plurality of ribbons being wound spirally and arranged side by side to have a plurality of ends in the region of each said tread edge, and the ends of all of the ribbons in the first and second band layers are equiangularly shifted around the tire axis at each said tread edge.

5. The radial tire according to claim 1 wherein the lateral edges of adjacent ribbons are in abutting relationship.

6. A motorcycle radial tire comprising
   a tread, said tread having a pair of tread edges and being curved so as to extend so that the tread width between the tread edges is the maximum width of the tire,
   a toroidal carcass extending between a pair of bead portions and turned up around a bead core disposed in each of said bead portions,
   a belt reinforcement disposed radially outside the carcass and inside the tread,
   said belt reinforcement comprising a band layer formed by a plurality of ribbons of rubber in which one cord or two parallel cords are embedded, each of the ribbons having a rectangular cross-sectional shape,
   the plurality of ribbons being wound spirally and arranged side by side to have a plurality of ends in the region of each said tread edge, and
   said plurality of ends of the plurality of ribbons being shifted equiangularly in the circumferential direction of the tire.

7. The radial tire according to claim 6 wherein the lateral edges of adjacent ribbons are in abutting relationship.

8. The tire according to claim 6, wherein the ribbons are wound continuously from one edge to the other edge of the tread.

9. The tire according to claim 6, wherein said belt reinforcement is composed of only said band layer.

* * * * *